Aug. 11, 1970 W. K. HICKOK 3,524,021

NOISE-IMMUNE SYNCHRONIZATION PULSE SEPARATION AND AUTOMATIC GAIN CONTROL CIRCUITRY

Filed April 20, 1967 3 Sheets-Sheet 1

INVENTOR.
WILLIAM K. HICKOK

BY Robert E. Strauss

ATTORNEY

Aug. 11, 1970 W. K. HICKOK 3,524,021

NOISE-IMMUNE SYNCHRONIZATION PULSE SEPARATION AND AUTOMATIC GAIN CONTROL CIRCUITRY

Filed April 20, 1967 3 Sheets-Sheet 2

INVENTOR.
WILLIAM K. HICKOK
BY Robert E. Strauss
ATTORNEY

INVENTOR.
WILLIAM K. HICKOK
BY
Robert E. Strauss
ATTORNEY

United States Patent Office 3,524,021
Patented Aug. 11, 1970

3,524,021

NOISE-IMMUNE SYNCHRONIZATION PULSE SEPARATION AND AUTOMATIC GAIN CONTROL CIRCUITRY

William K. Hickok, Williamsville, N.Y., assignor to Sylvania Electric Products Inc., a corporation of Delaware Filed Apr. 20, 1967, Ser. No. 632,397
Int. Cl. H04n 5/56
U.S. Cl. 178—7.3 11 Claims

ABSTRACT OF THE DISCLOSURE

Circuitry is provided for developing noise-immune synchronization pulse and automatic gain control signals from composite video signals which include video, synchronizing pulse, and undesired noise signals. Means are provided for developing a noise-gated video signal from the composite video signal and applying the noise-gated video signal to an automatic gain control system, a D.C. voltage level development means, and to a discriminator means. The automatic gain control system develops noise-immune automatic gain control signals which are applied to and control the operation of the receiver. The D.C. voltage level development means provides a D.C. voltage level which is applied to the discriminator means wherein the magnitude of the D.C. voltage level and the noise-gated signal are compared. The discriminator means provides one level of output signals when the noise-gated video signals are of a magnitude less than the D.C. voltage level and another level of output signals when the magnitude of the noise-gated video signals are of a magnitude greater than the D.C. voltage level. These two levels of output signals are in the form of noise-immune synchronizing pulse signals which are applied to and modify the operation of the signal receiver.

BACKGROUND OF THE INVENTION

One of the many problems in present-day television receivers is erratic operation due to the presence of undesired noise signals. In most instances, the composite video signal available in the signal receiver includes the video information, synchronizing pulse signals and undesired noise signals of both the random and impulse type having magnitudes less than and greater than the synchronizing pulse signals. These undesired noise signals are deleterious to the operation of the receiver and it becomes a problem to remove the noise signals without adversely affecting the video information and synchronizing pulse signals.

The prior art suggests numerous techniques for reducing the effects of these undesired noise signals and each of these techniques has been employed to provide reasonably satisfactory results in television receivers. For example, one well-known practice employs circuitry which includes a plurality of relatively short and relatively long time delay networks. Thus, the undesired noise signals are substantially "blocked" from reaching the synchronizing pulse separation and automatic gain control circuitry.

Another approach, which perhaps may best be classified as "noise-gating," employs a vacuum tube having a gating grid. The vacuum tube is biased to a conductive state and the gating grid is employed to render the tube nonconductive in the presence of noise signals having a relatively large magnitude.

Still another approach is the so-called noise-cancellation system. Therein, a vacuum tube is triggered into a conductive state by a relatively large noise signal to provide an output signal representative of the noise signal. This output signal is applied to or combined with the original noise signal to effect cancellation of the noise signals undesirably present in a composite video signal wherefrom the synchronizing pulse signals are separated.

As previously mentioned, each of the above techniques has been utilized in television receivers with varying degrees of success. However, each has one or more of such undesirable features as relatively slow switching time, incomplete switching, undesired loading of the signal source, complex circuitry arrangements, expensive component array, and components having values not readily adapted to monolithic integrated circuit design.

OBJECTS AND SUMMARY OF THE INVENTION

It is an object of the present invention to enhance the synchronization pulse separation and automatic gain control circuitry of a television receiver. Another object of the present invention is to provide noise-immune synchronizing pulse separation and automatic gain control circuitry for a television receiver. Still another object of the invention is to provide a signal having synchronizing pulse signals substantially free from undesired random and impulse noise signals therebetween. A further object of the invention is to provide circuitry for developing noise-immune synchronizing pulse signals from a composite video signal which includes undesired noise signals. A still further object of the invention is to provide synchronizing pulse separation and automatic gain control circuitry adapted to monolithic integrated circuit design.

Briefly these objects are achieved in one aspect of the invention by circuitry which included means responsive to a composite video signal for developing a noise-gated video signal and means responsive to the noise-gated video signal for developing an automatic gain control signal, a D.C. voltage level, and synchronizing pulse signals in accordance with noise-gated video signals having greater and less magnitude than the D.C. voltage level.

DESCRIPTION OF THE PREFERRED EMBODIMENT

For a better understanding of the present invention, together with other and further objects, advantages, and capabilities thereof, reference is made to the above-mentioned drawings and the appended claims in connection with the following description of a specific embodiment.

Figure 1:
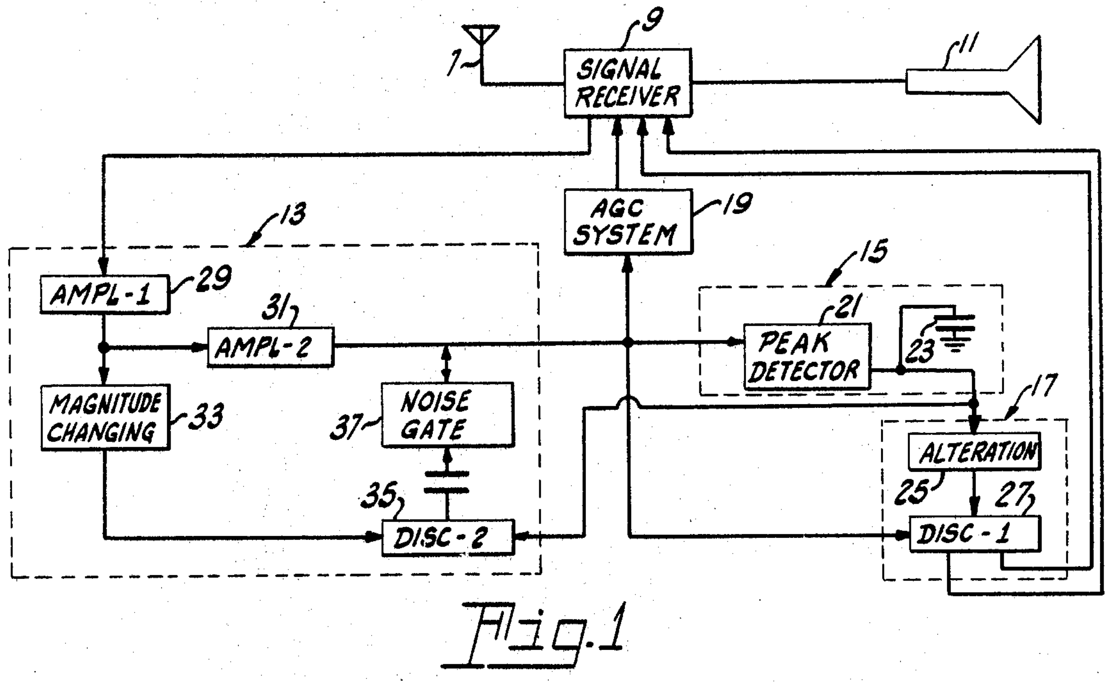
FIG. 1 is a block diagram of a television receiver illustrating one embodiment of the invention.

Referring to the drawings, FIG. 1 illustrates, in block form, a television receiver which includes the usual antenna 7, signal receiver 9, and image reproduced 11. The antenna 7 intercepts a transmitted television signal and couples this intercepted signal to the signal receiver 9 wherein is included all of the means necessary to the development of signals required for energization of the image reproduced 11. Among the signals developed in the signal receiver 9 are composite video signals which include video and synchronizing pulse signals as well as undesired noise signals of both the random type having a magnitude less than the magnitude of the synchronizing pulse signals and the impulse type having a magnitude greater than the magnitude of the synchronizing pulse signals.

Coupled to the signal receiver 9 is a noise-immune synchronizing pulse separation and automatic gain control (AGC) circuit. In general, the noise-immune synchronizing pulse separation and automatic gain control circuitry includes a first or noise-gated video signal development means 13. This first means 13 develops a noise-gated video signal from the composite video signal of the signal receiver 9 and applies this noise-gated video signal to a second or D.C. voltage level development means 15, to a third or discriminator means 17, and to an automatic gain control (AGC) system 19.

The D.C. voltage level development means 15 responds to the synchronizing pulse signals of the noise-gated video signal to provide a D.C. voltage level which is also applied to the third or discriminator means 17. The discriminator means 17 compares the magnitude of the D.C. voltage level and the applied noise-gated video signal and provides one level of output signal for noise-gated video signals having a magnitude greater than the D.C. voltage level and switches to another level of output signal for noise-gated video signals having a magnitude less than the D.C. voltage level. These output signals are in the form of noise-immune synchronizing pulse signals which are applied to and control the operation of the signal receiver 9.

Also, the noise-gated video signals available from the first or noise-gated video signal development means 13 are applied to the AGC system 19. The AGC system 19 responds to the maximum level or "tips" of the noise-gated synchronizing pulse signals of the noise-gated video signals to provide noise-immune automatic gain control signals which are applied to and modify the operation of the signal receiver 9.

More specifically, the embodiment of FIG. 1 includes a first or noise-gated video signal development means 13, which will be explained more fully hereinafter, wherein a noise-gated video signal is developed from a composite video signal of the signal receiver 9. The noise-gated video signal is applied to the second or D.C. voltage level development means 15 which includes a peak level detection stage 21 and a capacitive means 23 coupled intermediate thereto and circuit ground. This peak level detection stage 21 and capacitive means 23 combine to provide a D.C. voltage level having a magnitude slightly less than the magnitude of the applied noise-gated synchronizing pulse signal of the noise-gated video signals.

The noise-gated video signals available from the noise-gated video signal development means 13 and the D.C. voltage level available from the D.C. voltage level development means 15 are applied to the third or discriminator means 17. The discriminator means 17 includes an alteration means 25 and a discriminator stage 27. The alteration means 25, in this embodiment, is in the form of a voltage divider coupled intermediate the D.C. voltage level development means 15 and the discriminator stage 27. The alteration means reduces the magnitude of the D.C. voltage level by an amount which is substantially one-half the magnitude of the noise-gated synchronizing pulse signals of the noise-gated video signals applied to the discriminator stage 27.

The discriminator stage 27 receives this reduced level of D.C. voltage and the noise-gated video signals and provides a first level of output signal for noise-gated video signals of a magnitude less than the mangitude of the reduced D.C. voltage level and a second level of output signal for noise-gated video signals of a magnitude greater than the magnitude of the reduced D.C. voltage level. These output signals levels are in the form of noise-immune synchronizing pulse signals which are applied to the signal receiver 9.

Figure 4:
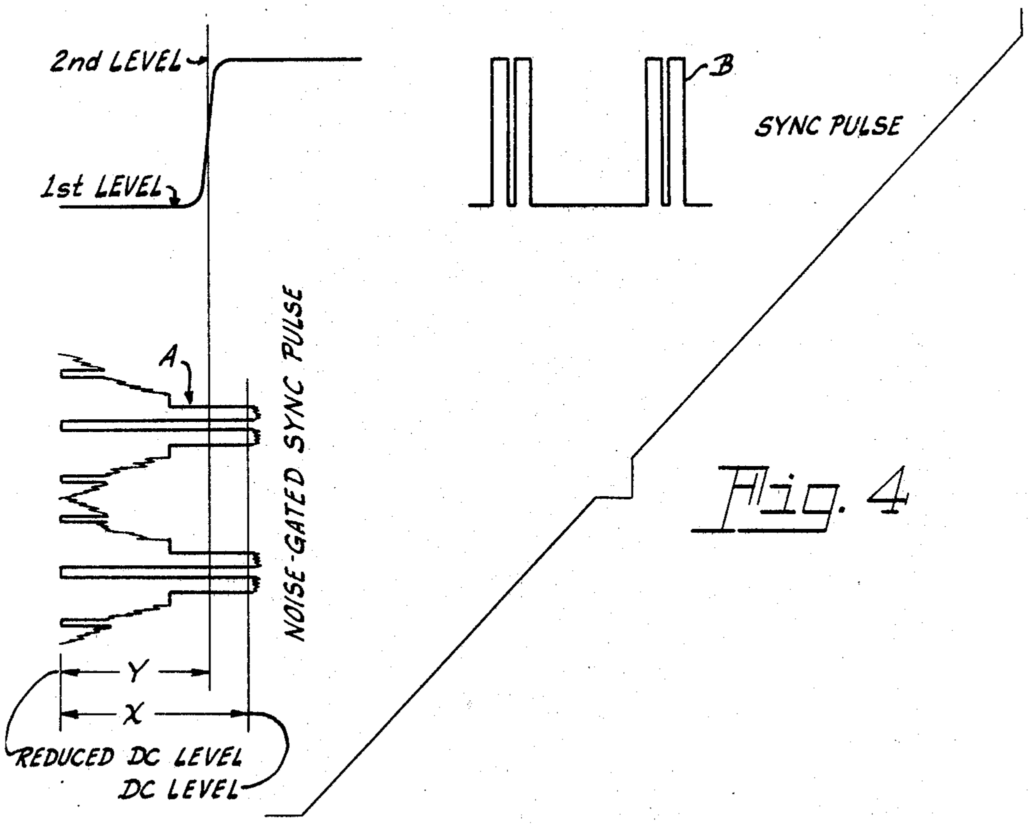
FIG. 4 is an explanatory chart illustrating the operation of a portion of the schematic illustration of FIG. 3.

To more clearly illustrate the above description, reference is made to the illustration of FIG. 4. Therein is shown a noise-gated video signal A available from the noise-gated video signal development means 13. Also, the D.C. voltage level X having a magnitude slightly less than the magnitude of the synchronizing pulse signals is provided by the D.C. voltage level development means 15. This D.C. voltage level 15 reduced by the alteration means 25 to a reduced D.C. voltage level Y having a magnitude which is reduced by a value substantially equal to one-half the magnitude of the synchronizing pulse signals.

Since the discriminator stage 27 has the capability of providing a first level of output signals in response to noise-gated video signals of a magnitude less than the reduced D.C. voltage level Y and a second level of output signals when the noise-gated video signals are of a magnitude greater than the reduced D.C. voltage level Y, there is developed noise-immune synchronizing pulse signals B. These noise-immune synchronizing pulse signals B are substantially unaffected by impulse noise signals of a magnitude greater than the synchronizing pulse signals. Moreover, the noise-immune synchronizing pulse signals B are independent of the magnitude and duration of the applied pulse signals and the circuitry is unresponsive to noise or video signals of a magnitude less than the reduced D.C. voltage level Y which is approximately 50% of the applied pulse signals.

Referring back to the noise-gated video signal development means 13 of FIG. 1, there is provided a first amplifier stage 29 coupled to a composite video signal means of the signal receiver 9 and to a second amplifier stage 31 and a magnitude changing means 33. Therein, a composite video signal of reduced magnitude available from the magnitude changing means 33 is applied to a second discriminator stage 35 which also receives a level of D.C. voltage available from the D.C. voltage level development means 15.

The second discriminator stage 35 compares the composite video signal of reduced magnitude with the D.C. voltage level and provides output signals in response to noise signals in the reduced composite video signal which are of a magnitude greater than the D.C. voltage level. These output signals are applied to a noise-gating stage 37 which provides amplification of the above-mentioned output signals and combines the amplified output signals with the composite video signals available from the second amplifier stage 31. In this manner, noise in the composite video signals is substantially conceled or gated to provide noise-gated video signals.

Figure 5:
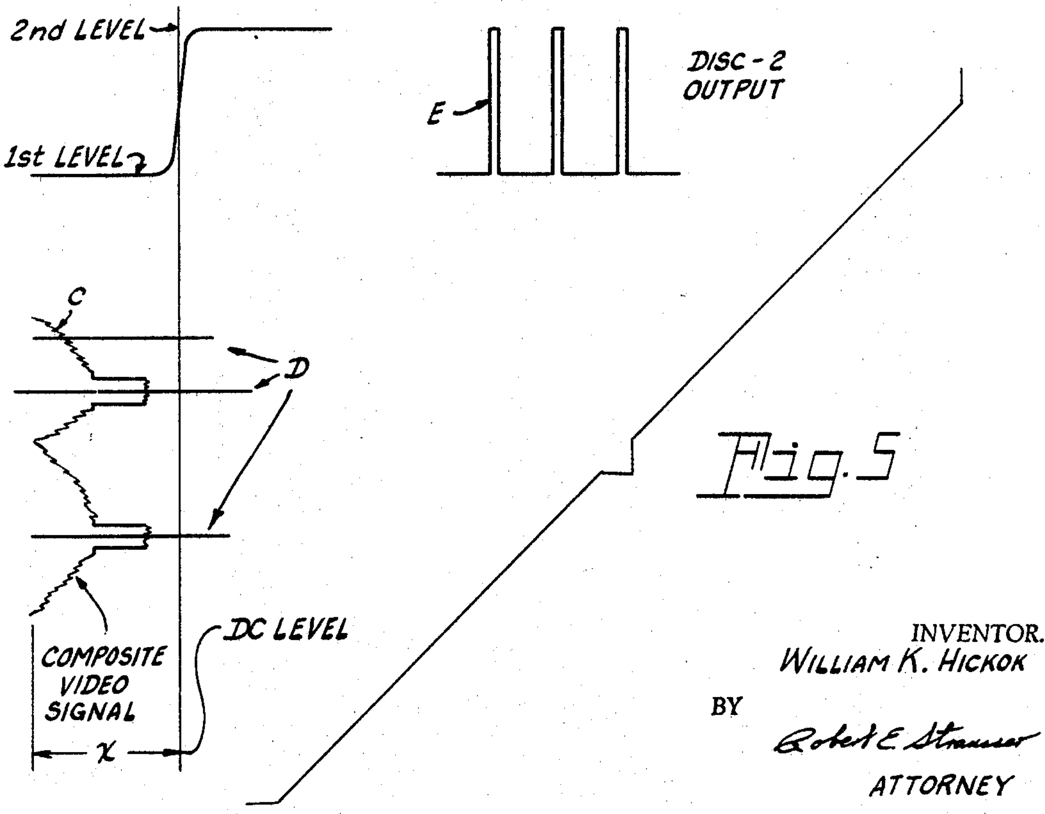
FIG. 5 is an explanatory chart illustrating the operation of another portion of the schematic illustration of FIG. 3.

To further illustrate the above description, reference is made to FIG. 5 of the drawings. Therein is illustrated a composite video signal of reduced magnitude C as well as the previously mentioned D.C. voltage level X available from the D.C. voltage development means 15. As previously explained with respect to the first discriminator stage 27, the second discriminator stage 35 provides a first level of output signals when the composite video signal of reduced magnitude C is less than the D.C. voltage level X and a second level of output signals when the composite video signal of reduced magnitude C is greater than the D.C. voltage level X. Thus, random noise pulses D of a magnitude greater than the D.C. voltage X cause development of control signals E which are available from the second discriminator stage 35.

These control signals E are applied to the noise gating means 37 wherein the control signals E are amplified and the amplified control signals combined with the composite video signals available from the second amplifier stage 31 to substantially effect cancellation or gating of the noise signals in the composite video signals. Thus, noise-gated video signals are provided.

Moreover, the above-mentioned noise-gated video signals are applied to vertical synchronization apparatus wherein the vertical synchronizing signals are integrated in a well known manner rendering the blanked portion of the noise-immune synchronizing pulse signals B substantially unnoticeable. Also, the unmultilated leading edge of the synchronizing pulse signals B is employed to activate horizontal scanning using well known AGC systems techniques wherein any disturbance due to multiple pulses would be minor in comparison with unwanted noise pulses.

Figure 2:
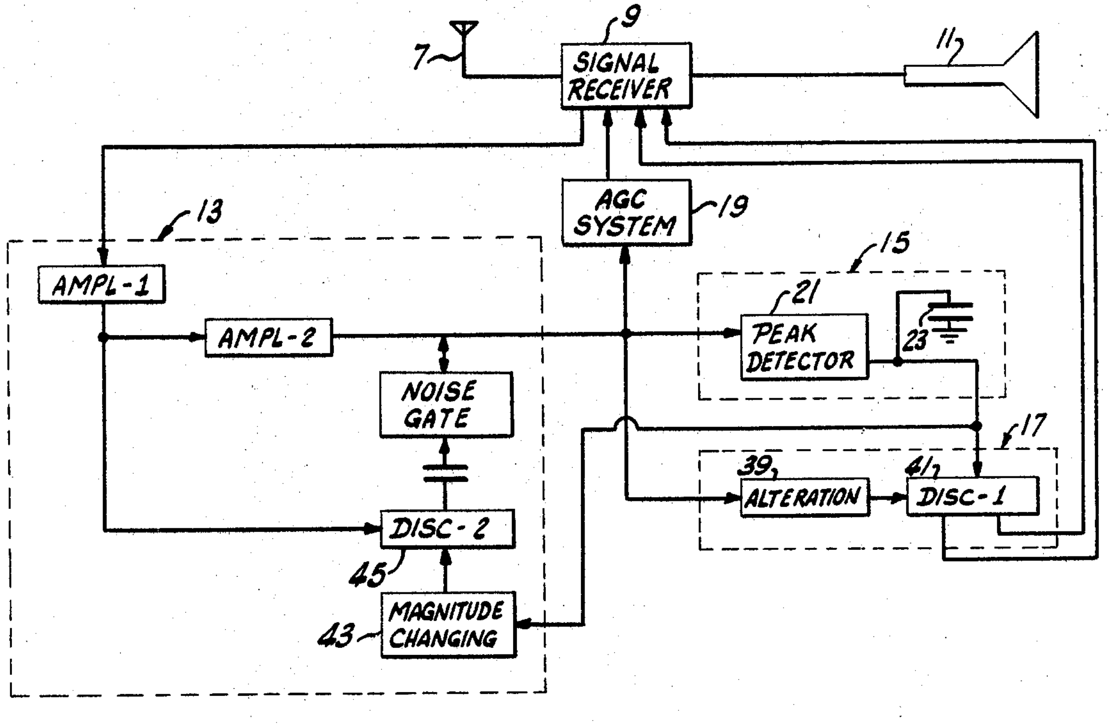
FIG. 2 is a block diagram of a television receiver illustrating another embodiment of the invention.

FIG. 2 illustrates an alternative embodiment of a noise-immune synchronizing pulse separation and AGC system which is somewhat similar to the embodiment of FIG. 1. Herein, the television receiver includes an identical antenna 7, signal receiver 9, and image reproducer 11. Also, there is provided a first or noise-gated video signal development means 13, a second or D.C. voltage development means 15, a third or discriminator means 17, and an AGC system 19.

However, in this embodiment, the third or discriminator means 17 includes an alteration means 39 in the form of an amplification stage coupled intermediate the first or gated video signal development means 13 and the discriminator stage 41. Thus, the magnitude of the gated video signal is increased for comparison with the D.C. voltage level available from the D.C. voltage development means 15.

In a similar manner, the first or noise-gated video development means 13 includes a magnitude changing means 43 in the form of a D.C. amplification stage coupled intermediate the second or D.C. voltage development means 15 and the second discriminator stage 45. Thus, the magnitude of the D.C. voltage is increased for comparison with the composite video signal as previously described with repect to the embodiment of FIG. 1.

As a specific illustration of the embodiment of FIG. 1, FIG. 3 includes a first or noise-gated video signal development means 13, which will be explained hereinafter, a second or D.C. voltage level development means 15, a third or discriminator means 17 and an AGC system 19.

The first or noise-gated video signal development means 13 provides a noise-gated video signal at the junction 47. This noise-gated video signal is coupled to an AGC system 19 and to the peak level detection stage 21. The peak level detection stage 21 is in the form of a transistor 49 having a base coupled by a resistor 48 to the junction 47, a collector coupled via a resistor 51 to a voltage source B+, and an emitter coupled via the capacitive means 23 to circuit ground and to the discriminator means 17.

The discriminator means 17 includes a voltage divider having an alteration means 25 in the form of first and second series connected resistors 53 and 55 respectively connected intermediate the D.C. voltage level development means 15 and circuit ground. The junction of the series connected resistors 53 and 55 is connected to the first discriminator stage 27. The first discriminator stage 27 includes a first and second transistor 57 and 59 each having a collector coupled via a resistor 61 and 63 to a voltage source B+ and to the signal receiver 9. The emitters of the transistors 57 and 59 are connected in common to circuit ground by way of substantially constant current network 65 including first and second transistors 67 and 69 coupled via a resistor 71 to a voltage source B+. Also, the base of the first transistor 57 is coupled to the junction of the series connected resistors 53 and 55 and the base of the second transistor 59 is coupled to the junction 47.

The AGC system 19 includes a transistor 73 having a base coupled to the junction 47 by a resistor 75, an emitter coupled to the signal receiver 9 and a collector coupled via a diode 77 to the signal receiver 9. Thus, the AGC system 19 is responsive to the noise-gated video signal available at the junction 47.

The first or noise-gated video signal development means 13 includes a first amplifier stage 29 in the form of a transistor 79 having a base coupled to a composite video signal source of the signal receiver 9, a collector coupled to a voltage source B+ by a resistor 81, an emitter coupled by a load resistor 83 to circuit ground and to the second amplifier stage 31 and the magnitude changing means 33. The second amplifier stage 31 is in the form of a transistor 85 having the collector coupled to a voltage source B+ by a resistor 87, the emitter coupled to circuit ground by a resistor 89 and the base coupled to the first amplifier stage 29.

The magnitude changing means 33 includes a first transistor 91 having a base coupled to the source of composite video signals or first amplifier stage 21, an emitter coupled by a resistor 93 to circuit ground and a collector coupled by a resistor 95 to a voltage source B+ and to the base of a second transistor 97 having a collector coupled to a voltage source B+ by a resistor 99 and an emitter coupled to circuit ground by a resistor 101 and by a pair of series connected resistors 103 and 105. The junction of the series connected resistors 103 and 105 is coupled to the base of a first transistor 107 of the second discriminator stage 35.

This second discriminator stage 35 includes the first transistor 107 and a second transistor 109 each having a collector coupled to a voltage source B+ by resistors, 111 and 113 respectively, and emitters coupled in common to circuit ground by a substantially constant current network 115 including first and second transistors 117 and 119 coupled via a resistor 121 to a voltage source B+. Also, the base of the second transistor 109 is coupled to the emitter of the transistor 49 of the D.C. voltage development means 15.

The collector of the second transistor 109 is coupled via a second capactive means 123 to the base of the transistor 125 of the noise-gating stage 37. The base of the transistor 125 is connected to circuit ground by a resistor 126, the emitter is connected to the emitter of the transistor 85 of the second amplifier stage 31, and the collector is connected to the collector of the transistor 85 of the second amplifier stage 21. Also, the collectors of transistors 85 and 125 are connected in common to the base of an emitter follower stage in the form of a transistor 127 having a collector coupled to a voltage source B+ by a resistor 129 and an emitter coupled to circuit ground by a resistor 131 and to the junction 47.

To again summarize the operation, the first or noise-gated video signal development means 13 develops a noise-gated video signal from a composite video signal available in the signal receiver 9. This noise-gated video signal, available at the junction 47, is applied to the D.C. voltage development means 15 wherein the peak level detector stage 21 in combination with the capacitive means 23 serve to develop a D.C. voltage level having a magnitude slightly less than the magnitude of the noise-gated synchronizing pulse signals of the applied noise-gated video signals.

The D.C. voltage level is applied to the discriminator means 17 wherein the alteration means 25 reduces the magnitude thereof by an amount substantially equal to one-half the magnitude of the noise-gated synchronizing pulse signal of the composite video signals. The noise-gated composite video signals and the reduced D.C. voltage level are applied to the first discriminator stage 27 wherein is developed a first level of output signal when the noise-gated video signals are of smaller magnitude than the reduced D.C. voltage level and a second level of output signal when the noise-gated video signals are of larger magnitude than the reduced D.C. voltage level. These output signals are in the form of noise-immune synchronizing pulse signals which are applied to the signal receiver 9.

Also, the AGC system 19 is responsive to the maximum amplitude of the synchronizing pulse signals of the noise-gated video signals available at the junction 47. Since noise signals having a magnitude greater than the synchronizing pulse signals have been removed from the noise-gated video signals, in a manner previously explained, the AGC system 19 is substantially unaffected by noise signals and provides substantially noise-immune control signals which are also coupled to the signal receiver 9.

Further, the first or noise-gated signal development means 13 receives a composite video signal from the signal receiver 9. This composite video signal is reduced in magnitude and applied to the second discriminator stage 35 which also received a D.C. voltage level from the D.C. voltage development means 15. Since the reduced magnitude of the composite video signal including the synchronizing pulse signals therein is less than the magnitude of the D.C. voltage level except for relatively large impulse noise signals, the second discriminator stage provides output signals representative of these relatively large noise signals. These output signals are applied to a noise-gating means which also provides amplification thereof and combines these signals with the composite video signals to effectively cancel or "gate" the noise signals from the composite video signals and provide noise-gated video signals at the junction 47.

It should perhaps be noted at this point that the second capacitive means 123 may be omitted so long as the circuitry is arranged such that the reduced composite video signals applied to the second discriminator stage 35 include synchronizing pulse signals of a magnitude less than the magnitude of the D.C. voltage level. In other words, the circuitry should be arranged such that the application of a relatively strong composite video signal will cause the magnitude reducing circuitry 33 to reach saturation and provide a composite video signal wherein the magnitude of the synchronizing pulse signals therein is less than the magnitude of the D.C. voltage level.

Also, it should be noted that the noise-immune synchronizing pulse separation and AGC circuitry is particularly well adapted to monolithic integrated circuit design. Not only are the active components operable within a wide range of parameters but also the passive components are of noncritical value as well.

Figure 3:
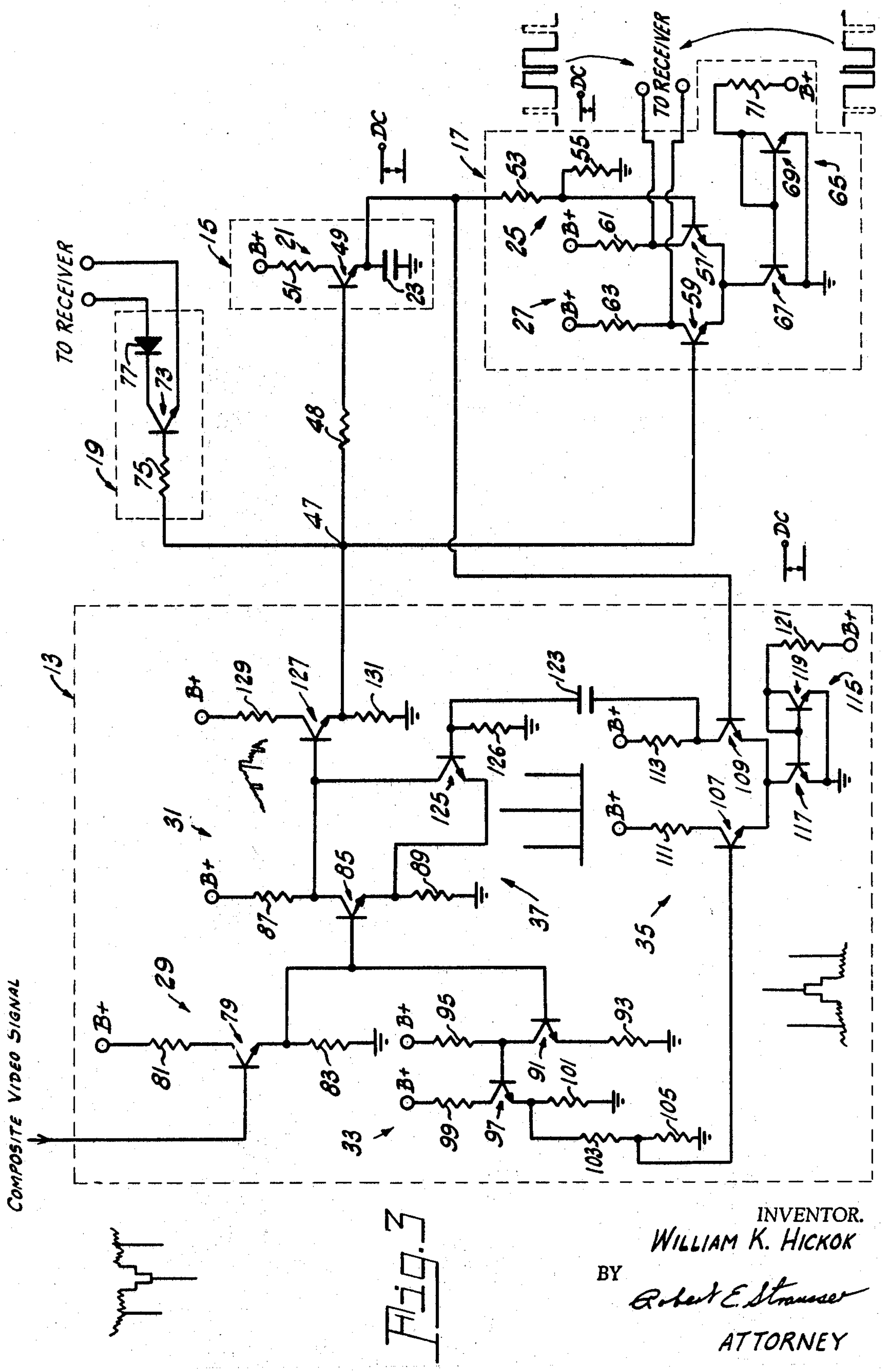
FIG. 3 is a schematic illustration of noise-immune synchronizing pulse separation and automatic gain control circuitry of the embodiment of FIG. 1.

As a typical example of appropriate circuit constants suitable for use in a particular embodiment of the invention but in no way to be construed as limiting the invention, the following circuit constants may be utilized in the embodiment illustrated in FIG. 3;

Resistors:
- 53, 81, 83, 89, 93, 101, 131—470 ohms
- 48, 61, 63, 95, 99, 103—1000 ohms
- 87, 95, 126—2200 ohms
- 71, 105, 121—3900 ohms
- 55, 75—8200 ohms Capacitor:
- 123—1$\mu f$.

Diode 1N4092: 77

Transistors SE1001 (GR)—Fairchild part No. 2N3693:
- 49, 57, 59, 67, 69, 73, 79, 85, 91, 97, 107, 109, 117, 119, 125, 127

Thus, unique noise-immune synchronizing pulse separation and automatic gain control circuitry has been provided which is especially adapted to television receivers. The circuitry is simple and efficient and greatly enhances the operation of a television receiver. Also, the circuitry is especially adapted to inexpensive and compact monolithic integrated circuit design due to the wide range of parameters applicable to the active components as well as the noncritical values appropriate to the passive components. Moreover, the circuitry provides a noise-immunity capability which is believed to be unattainable in any known television receiver.

While there has been shown and described what is at present considered the preferred embodiment of the invention, it will be obvious to those skilled in the art that various changes and modifications may be made therein without departing from the scope of the invention as defined by the appended claims.

What is claimed is:

1. In a television receiver having a composite video signal source providing video and synchronizing pulse signals which tend to be accompanied by undesired noise signals, noise-immune synchronizing pulse separation circuitry comprising in combination:
- first means coupled to said composite video signal source for developing noise-gated vedeo and synchronizing pulse signals;
- second means coupled to said first means and responsive to said noise-gated synchronizing pulse signals to cause development of a D.C. voltage level; and
- third means coupled to said first and second means and to said receiver and responsive to said noise-gated synchronizing pulse signals and said D.C. voltage level, said third means including discriminator means for providing first and second levels of output signals in response to said noise-gated synchronizing pulse signals having magnitudes greater and less than said D.C. voltage level and alteration means in the form of a voltage divider coupling said discriminator means to said second means for varying the magnitude of said noise-gated synchronizing pulse signal and said D.C. voltage level with respect to one another.

2. The noise-immune synchronizing pulse separation circuitry of claim 1 wherein said second means for developing a D.C. voltage level includes a peak level detector stage and a capacitive means coupled intermediate the detector stage and circuit ground, said peak level detector stage responding to said noise-gated synchronizing pulse signals of said noise-gated video signals to charge said capacitive means and provide a D.C. voltage level having a magnitude less than the magnitude of said noise-gated synchronizing pulse signals.

3. The noise-immune synchronizing pulse separation circuitry of claim 1 wherein said second means for developing a D.C. voltage level includes a peak level detector stage and a capacitive means, said detector stage including a transistor having a base, collector, and emitter with said base coupled to said first means providing said noise-gated video signals, said collector coupled to a voltage source, and said emitter coupled to circuit ground by said capacitive means and to said third means.

4. The noise-immune synchronizing pulse separation circuitry of claim 1 wherein said discriminator means is in the form of a first and second transistor each having an emitter, collector, and base, said emitters of both of said transistors being coupled in common to a substantially constant current bias source, said collector of each of said transistors being coupled to a voltage source by a load resistor and to said receiver, and said base of one of said transistors being coupled by said alteration means to one of said first and second means and said base of the other of said transistors being coupled to the other one of said first and second means.

5. The noise-immune synchronizing pulse separation circuitry of claim 1 wherein said first means for developing noise-gated video and synchronizing pulse signals includes a second discriminator means and a noise-gate means, said second discriminator means being coupled to said composite video signal source and said second means for developing a D.C. voltage level and said noise-gate means coupling said second discriminator means to said composite video signal source whereby said second discriminator means develops output signals in response to noise signals in said composite video signal of greater magnitude than said D.C. voltage level and said noise-gate means combines the output signals with the composite video signals to substantially effect cancellation of noise signals therein and provide noise-gated video signals.

6. The noise-immune synchronizing pulse separation circuitry of claim 5 wherein said first means includes a magnitude determining means coupling said second discriminator means to one of said composite video signal source and said second means for developing a D.C. voltage level.

7. The noise-immune synchronizing pulse separation circuitry of claim 5 wherein said first means for developing noise-gated video and synchronizing pulse signals includes amplifier means and magnitude determining means coupled in common to said composite video source, second discriminator means coupled to said magnitude determining means and to said second means for developing a D.C. voltage level, and noise-gating means coupling said second discriminator means to said amplifier means and said second means for developing a D.C. voltage level.

8. The noise-immune synchronizing pulse separation circuitry of claim 7 including a second capacitive means coupling said noise-gating means and said second discriminator means.

9. In a television receiver having means for developing composite video signals which include video and synchronizing pulse signals which tend to be accompanied by undesired noise signals, noise-immune synchronizing pulse separation and automatic gain control circuitry comprising in combination:

noise-gated video and synchronizing pulse signal development means coupled to said composite video signal development means of said receiver, said means including a second discriminator means coupled to said composite video signal development means of said receiver and noise-gate means coupled to said second discriminator means and to said composite video signal development means of said receiver, said noise-gate means combining said output signals from said second discriminator means and said composite video signal development means to effect cancellation of noise signals in said composite video signals and provide noise-gated video and synchronizing pulse signals;

automatic gain control means coupling said noise-gated video and synchronizing pulse signal development means to said receiver;

D.C. voltage level development means coupled to said noise-gated video and synchronizing pulse signal development means and to said second discriminator means; and first discriminator means coupled to said noise-gated video and synchronizing pulse signal development means and said D.C. voltage level development means and to said receiver whereby said second discriminator means responds to said potentials from said D.C. voltage level development means to effect an output from said noise-gate means in response to noise signals in said composite video signal of a magnitude greater than the magnitude of said D.C. voltage level.

10. The noise-immune synchronizing pulse separation and automatic gain control circuitry of claim 9 wherein said noise-gated video and synchronizing pulse signal development means includes a magnitude determining means series connected intermediate said D.C. voltage level development means and said second discriminator means.

11. The noise-immune synchronizing pulse separation and automatic gain control circuitry of claim 9 wherein said D.C. voltage level development means includes a peak level detector stage and a capacitive means coupled intermediate thereto and circuit ground.

References Cited

UNITED STATES PATENTS

| | | | |
|---|---|---|---|
| 2,995,621 | 8/1961 | Freedman et al. | 178—7.3 |
| 2,680,806 | 6/1954 | Beste | 178—7.3 |
| 2,699,463 | 1/1955 | Kroger et al. | 178—7.3 |
| 2,717,920 | 9/1955 | Avins | 178—7.5 |
| 2,776,338 | 1/1957 | Avins | 178—7.3 |
| 2,791,627 | 5/1957 | Thomas et al. | 178—7.3 |
| 2,797,259 | 6/1957 | Thomas | 178—7.3 |
| 2,828,356 | 3/1958 | Macouski | 178—7.3 |
| 2,852,602 | 9/1958 | Foster | 178—7.5 |
| 2,950,342 | 8/1960 | Revercomb | 178—7.3 |

ROBERT L. GRIFFIN, Primary Examiner

J. C. MARTIN, Assistant Examiner

PO-1050
(5/69)

UNITED STATES PATENT OFFICE
CERTIFICATE OF CORRECTION

Patent No. 3,524,021 Dated 8/11/70

Inventor(s) William K. Hickok

It is certified that error appears in the above-identified patent and that said Letters Patent are hereby corrected as shown below:

Column 2, lines 62 and 67 of the specification "reproduced 11" should read --reproducer 11--.

Column 4, line 45 "conceled" should read--canceled--.

Column 7, line 49 - the following was left out entirely--capacitor: 23 10-uf--this should go directly after capacitor: 123 1-uf.

Column 9, Claim 7, line 4 "video source" should read--video signal source--.

SIGNED AND SEALED
OCT 20 1970

(SEAL)
Attest:

Edward M. Fletcher, Jr.
Attesting Officer

WILLIAM E. SCHUYLER, JR.
Commissioner of Patents